(12) United States Patent
Yanagi et al.

(10) Patent No.: US 9,113,018 B2
(45) Date of Patent: Aug. 18, 2015

(54) IMAGE FORMING APPARATUS, CONTROLLING METHOD OF IMAGE FORMING APPARATUS, AND STORING MEDIUM

(71) Applicant: CANON KABUSHIKI KAISHA, Tokyo (JP)

(72) Inventors: Naoyuki Yanagi, Yokohama (JP); Hitomi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/307,818

(22) Filed: Jun. 18, 2014

(65) Prior Publication Data

US 2014/0376016 A1      Dec. 25, 2014

(30) Foreign Application Priority Data

Jun. 24, 2013   (JP) .................................. 2013-131635

(51) Int. Cl.
*H04N 1/00*   (2006.01)
(52) U.S. Cl.
CPC ................................ *H04N 1/00649* (2013.01)

(58) Field of Classification Search
USPC ........................................................ 358/1.12
See application file for complete search history.

(56) References Cited

U.S. PATENT DOCUMENTS

| 2006/0159499 A1* | 7/2006 | Watanabe et al. ............. 399/391 |
| 2011/0052240 A1* | 3/2011 | Ikeda .............................. 399/81 |
| 2011/0052290 A1* | 3/2011 | Kurakata ...................... 399/388 |

FOREIGN PATENT DOCUMENTS

JP        2006-155360 A      6/2006

OTHER PUBLICATIONS

Kanji, Voice Guidance Device, Jun. 15, 2006, Machine Translated Japanese Patent Application Publication, JP2006155360, All Pages.*

* cited by examiner

*Primary Examiner* — Ngon Nguyen
(74) *Attorney, Agent, or Firm* — Fitzpatrick, Cella, Harper & Scinto

(57) ABSTRACT

In case of supplying sheets to a sheet holding unit, information concerning a depository of the sheet to be supplied is registered. Thus, it is possible to efficiently make a transition of work to supply work by reducing a load of the supply work to be performed by various users.

7 Claims, 12 Drawing Sheets

FIG. 5A

SETTING/REGISTRATION

<SETTING OF SHEET>

CASSETTE 1
CASSETTE 2
CASSETTE 3
CASSETTE 4
CASSETTE 5
CASSETTE 6
CASSETTE 7

SET ~502

SETTING/REGISTRATION

<SETTING OF SHEET : SHEET TYPE>

THIN PAPER (52 TO 63 g/m$^2$)
PLAIN PAPER (64 TO 90 g/m$^2$)
CARDBOARD (91 TO 180 g/m$^2$)
COLORED PAPER (64 TO 90 g/m$^2$)

RECYCLED PAPER
PUNCHED PAPER

511

CANCEL ~512          513~ OK

SETTING/REGISTRATION

<SETTING OF PRIORITY LIST>

SELECT SHEET CASSETTE, AND SHIFT BY [UPWARD]/
[DOWNWARD] KEYS

| CASSETTE NO. | SHEET SIZE | SHEET TYPE |
|---|---|---|
| CASSETTE 1 | A4 | PLAIN PAPER |
| CASSETTE 2 | B5 | PLAIN PAPER |
| CASSETTE 3 | A3 | PLAIN PAPER |
| CASSETTE 4 | A4 | PLAIN PAPER |

~1001
▲ ~1004
1/2
▼ ~1005

UPWARD ~1002   DOWNWARD ~1003

CANCEL ~1006        1007~ OK

IMAGE FORMING APPARATUS, CONTROLLING METHOD OF IMAGE FORMING APPARATUS, AND STORING MEDIUM

BACKGROUND OF THE INVENTION

1. Field of the Invention

The present invention relates to an image forming apparatus, a controlling method of the image forming apparatus, and a storing medium for storing a program to perform the controlling method.

2. Description of the Related Art

Conventionally, there has been an image forming apparatus which accepts copy setting from a user through an operation screen. Moreover, in the conventional image forming apparatuses, there has been a printing apparatus which notifies an operation guidance by a voice during a user's operation such that a blind user can easily perform an operation.

On another front, there has been the technique of displaying guidance information to call another user if an image forming apparatus runs out of a sheet (or a paper) (see Japanese Patent Application Laid-Open No. 2006-155360).

However, in the above conventional technique, it is merely possible to display only a same message when a lack of sheet occurs in any sheet holding unit. In other words, it is impossible, for each sheet holding unit, to notify a user of a keeping location (i.e., a depository) of the sheets to be supplied or replenished to the relevant sheet holding unit. Consequently, the user has to wait until maintenance work by another user is completed.

SUMMARY OF THE INVENTION

The present invention has been completed in consideration of such a problem as described above, and an object thereof is to provide an image forming apparatus which forms an image on a sheet transported from a sheet holding unit, comprising: a storing unit configured to store first information indicating a depository of the sheet to be supplied to a first sheet holding unit, and store second information indicating a depository of the sheet to be supplied to a second sheet holding unit different from the first sheet holding unit; and a notification unit configured to perform a notification based on the first information stored by the storing unit in case of supplying the sheet to the first sheet holding unit, and perform a notification based on the second information stored by the storing unit in case of supplying the sheet to the second sheet holding unit.

Further features of the present invention will become apparent from the following description of exemplary embodiments with reference to the attached drawings.

BRIEF DESCRIPTION OF THE DRAWINGS

FIGS. 5A and 5B are diagrams illustrating UI (user interface) screens to be displayed on an operation panel.

DESCRIPTION OF THE EMBODIMENTS

Hereinafter, preferred embodiments of the present invention will be described with reference to the attached drawings.

<Description of System Configuration>

[First Embodiment]

Figure 1A:
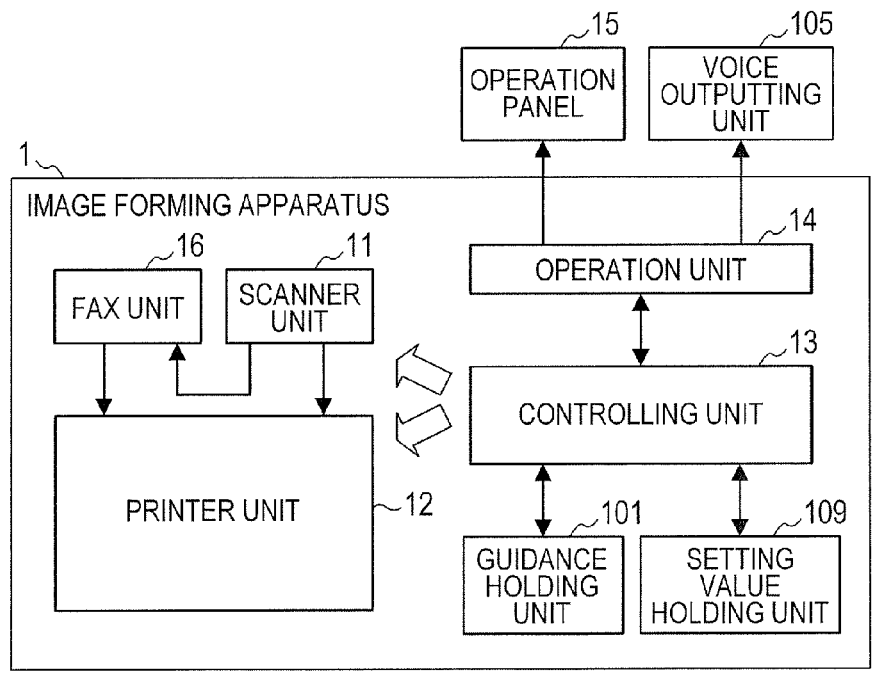
FIGS. 1A and 1B are block diagrams for describing a constitution of an image forming apparatus according to the present invention.
Figure 1B:
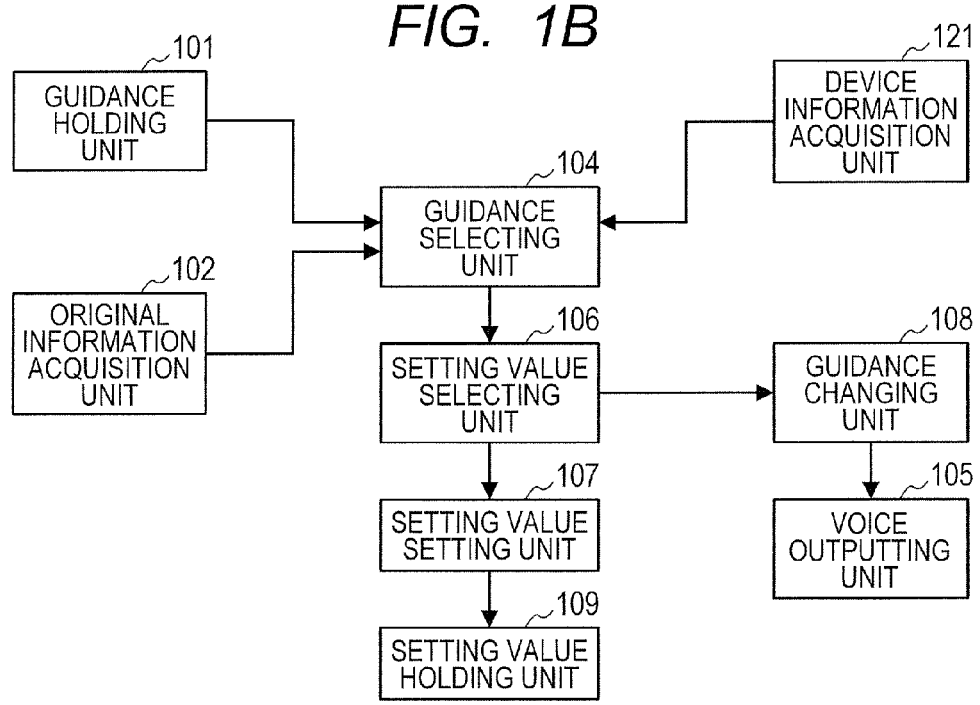

FIGS. 1A and 1B are block diagrams for describing a constitution of an image forming apparatus according to the first embodiment of the present invention. More specifically, FIG. 1A illustrates the hardware constitution of the image forming apparatus, and FIG. 1B illustrates the constitution of the main part of the image forming apparatus of FIG. 1A. Incidentally, it should be noted that the present invention is also applicable to a multifunction machine having a plurality of functions such as a copying function, a scanning function, a fax function and the like, or to a single-function printing apparatus.

In an image forming apparatus 1, a scanner unit optically reads an original image, and generates an image signal based on the read original image. A printer unit 12 prints the image signal acquired by the scanner unit 11. The constitutions of the scanner unit 11 and the printer unit 12, which together achieve a copying function, are not especially limited. In other words, a well-known constitution can be applied to each of the scanner unit 11 and the printer unit 12. Besides, the image forming apparatus 1 comprises a fax unit 16 to achieve a fax function. More specifically, the fax unit 16 performs fax transmission of the original image read by the scanner unit 11 to a transmission destination set through an operation unit 14. Moreover, the fax unit 16 decodes fax data received from an external fax machine, and causes the printer unit 12 to form an image based on the received and decoded fax data.

A controlling unit 13, which comprises a CPU (central processing unit) and a memory, controls the image forming apparatus 1 as a whole. The operation unit 14 provides a user interface which enables a user to perform various settings for the image forming apparatus 1.

Incidentally, the operation unit 14 comprises an operation panel 15 so as to have the function as a touch panel. Further, a voice outputting unit 105, which comprises a speaker, is used to notify a user of guidance information of the various settings (hereinafter, simply called "guidance") using voice synthesis.

A guidance holding unit 101 holds therein the guidance corresponding to various setting items. Thus, the controlling unit 13 selects the corresponding guidance in response to an operation input from the operation unit 14, and causes the voice outputting unit 105 to perform a voice output. A setting value holding unit 109 holds therein setting values settled according to various setting operations from the operation unit 14, in association with the setting items respectively. The controlling unit 13 controls the scanner unit 11 and the printer unit 12 by referring to the setting values held by the setting value holding unit 109.

FIG. 1B corresponds to the function constitution for achieving a user interface with a voice guidance function according to the present embodiment. Incidentally, it is assumed that the various functions included in FIG. 1B are achieved by the controlling unit 13 of the image forming apparatus 1. In addition, as is apparent from following descriptions, these functions are achieved on condition of cooperation by software and hardware. Incidentally, there is a case where the following description is performed mainly based on software modules based on the diagram of FIG. 1B and executed by the controlling unit 13.

The guidance holding unit 101, which is constituted by a storage medium such as a hard disk, a ROM (read only memory) or the like, holds the guidance corresponding to each of the plurality of the setting values for each setting item. An original information acquisition unit 102 acquires original information to be processed. For example, the original information is acquired by detecting the size of the original set on the scanner unit 11, or inputting operation information from the operation unit 14. A device information acquisition unit 121 acquires device information of the information processing apparatus.

A guidance selecting unit 104 selects one or more guidance held by the guidance holding unit 101, on the basis of the designated setting item, the original information, the device information and the like. A setting value selecting unit 106 selects one of the setting values corresponding to the selected guidance. The guidance corresponding to the selected setting value serves as the active guidance. Here, it should be noted that the active guidance is the guidance which is activated and thus in the active state.

A guidance changing unit 108 causes the voice outputting unit 105 to output the active guidance by a voice. A setting value setting unit 107 sets, to the setting item, the setting value selected by the setting value selecting unit 106 and settled by the user operation, and causes the setting value holding unit 109 to hold the set setting item, so that the setting value settled for each setting item is held in the setting value holding unit 109. Incidentally, the operation of each of such function blocks as described above will become further clear by the following description to be performed with reference to a flow chart illustrated in FIG. 2.

Figure 2:
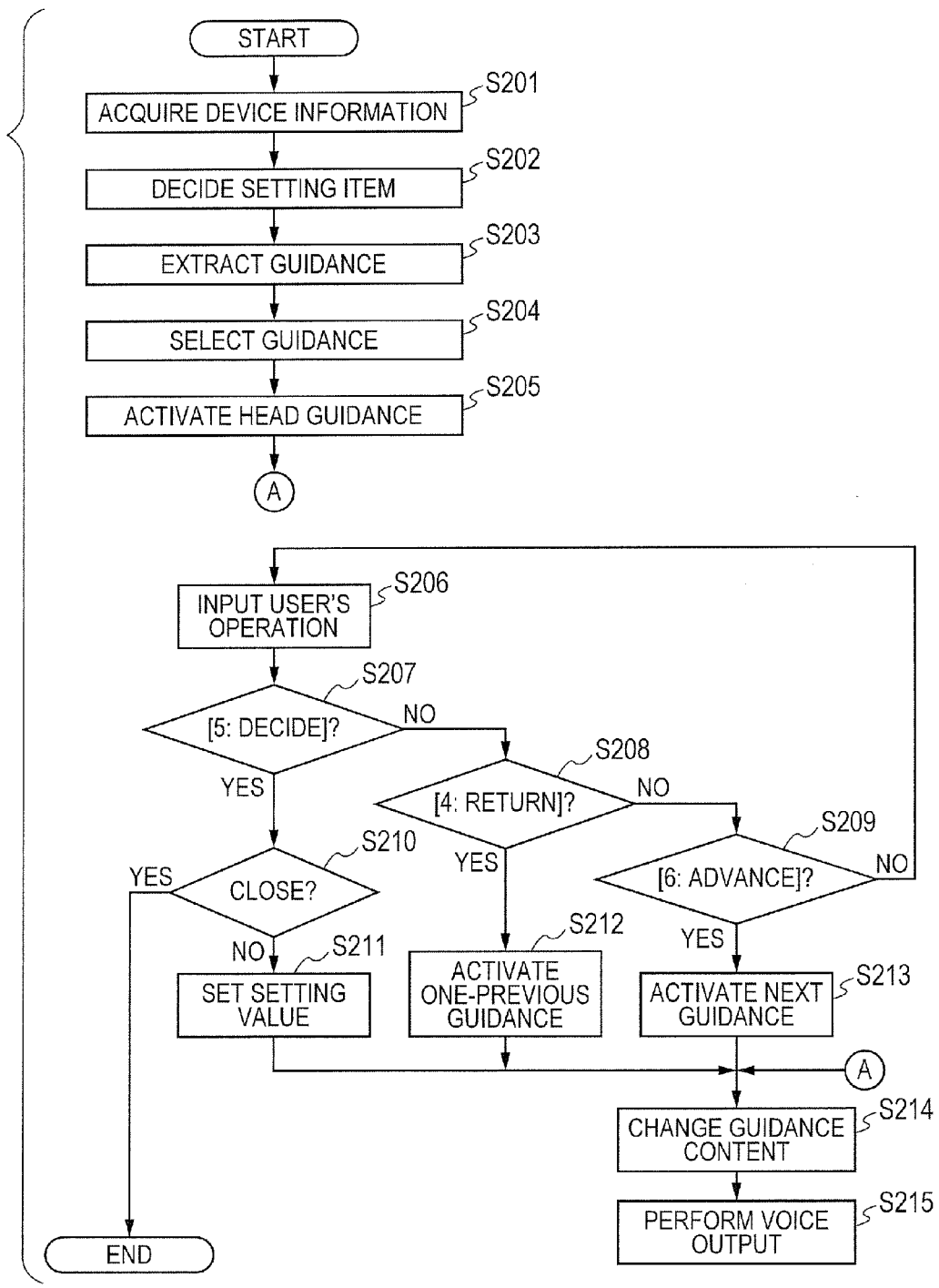
FIG. 2 is a flow chart for describing a controlling method of the image forming apparatus.

FIG. 2 is the flow chart for describing a controlling method of the image forming apparatus according to the present embodiment, and this is a processing procedure example by voice guidance provided by a printing apparatus. Incidentally, the respective steps included in the relevant flow chart are achieved on the condition that a CPU of the controlling unit 13 loads control programs stored in an ROM or the like to an RAM (random-access memory) or the like and executes the loaded programs.

In S201, the controlling unit 13 acquires the device information of the image forming apparatus. For example, the controlling unit acquires the device information based on the values output from sensors provided at respective points in the image forming apparatus 1. Here, the device information to be acquired includes information concerning a sheet cassette (i.e., an example of a sheet holding unit), information concerning presence or absence of sheets, information concerning a sheet, information concerning a toner residual quantity, information concerning a staple residual quantity, and the like. However, the present invention is not limited to them.

Next, in S202, the guidance selecting unit 104 decides the setting item for which the setting value should be set after this, in response to a selection instruction input by the user through the operation unit 14. For example, the guidance selecting unit 104 presents a GUI (graphical user interface) on the operation panel 15 to enable the user to designate a desired setting item. More specifically, since the operation panel 15 is constituted by the touch panel, the user can select the desired setting item by touching a rectangular mark corresponding to the desired setting item on the touch panel. Of course, it is possible to use a voice UI (user interface) so as to decide the setting item by voice recognition of a user voice.

In S203, the guidance selecting unit 104 extracts, from the guidance holding unit 101, the guidance corresponding to the setting item decided in S202. The guidance holding unit 101 holds a set of the setting value and the guidance for each setting item.

In S204, the guidance selecting unit 104 selects the guidance to be output by the voice from the guidance extracted in S203 (i.e., the guidance corresponding to the selected setting item), based on the device information acquired by the device information acquisition unit 121 in S201. Next, in S205, the setting value selecting unit 106 activates the head guidance in the guidance selected in S204, thereby producing the active guidance. Then, in S214, the guidance changing unit 108 changes the active guidance based on the device information acquired in S201.

Subsequently, in S215, the voice outputting unit 105 outputs by the voice the guidance changed in S214, using, e.g., voice synthesis, and then the process in the flow chart is terminated. Incidentally, if it is unnecessary to change the guidance, the process (of the guidance changing unit 108) in S214 is skipped.

Figure 3:
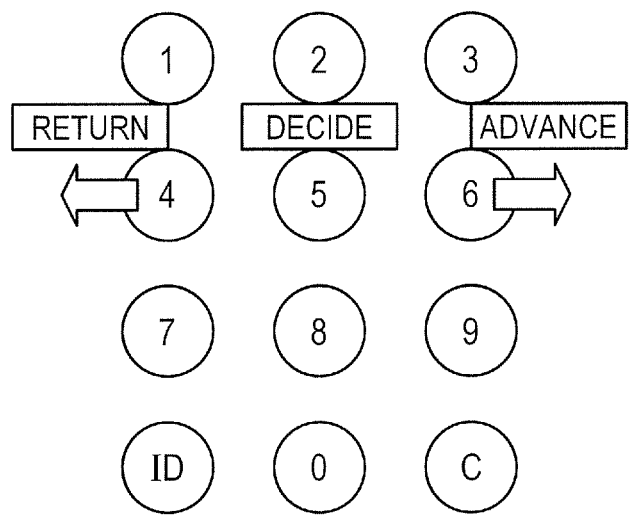
FIG. 3 is a diagram illustrating a configuration of a numerical keypad provided on an operation unit.

In S206, the operation content which is performed by the user through the operation unit 14 and used for selecting the setting value is input. In the present embodiment, a case where the setting value is selected by using a numerical keypad of the operation unit 14 as illustrated in FIG. 3 will be described. For example, the user changes over the active guidance by using the "4" and "6" keys of the numerical keypad, and then confirms the guidance to be output by the voice. If the user confirms the guidance corresponding to the desired setting value, he/she depresses the "5" key, so that the confirmed guidance is decided as the setting.

In this case, if the user depresses the "5" key, then the process advances from S207 to S210. In S210, the setting value selecting unit 106 determines whether or not the active guidance at that time corresponds to a controlling command "close". If the setting value selecting unit 106 determines that the active guidance corresponds to the controlling command "close", the process in the flow chart is terminated.

On the other hand, if the setting value selecting unit 106 determines in S210 that the active guidance does not correspond to the controlling command "close", the process advances to S211. In S211, the setting value setting unit 107 sets the setting value corresponding to the active guidance at that time to the setting item, and then stores and holds the set setting value in the setting value holding unit 109.

If NO in S207, that is, if the "4" key of the numerical keypad is depressed here, the process advances from S207 to S212 through S208. In S212, the setting value selecting unit 106 newly activates the one-previous guidance of the active guidance.

If NO in S208, that is, if the "6" key of the numerical keypad is depressed here, the process advances from S207 to S213 through S208 and S209. In S213, the setting value selecting unit 106 newly activates the next guidance of the active guidance. Incidentally, if any of the "4", "5" and "6" keys is not depressed, the process returns to S206.

If any of the processes in S211, S212 and S213 is terminated, the above processes of S214 and S215 are performed, so that the settled or newly activated guidance is output by the voice.

Figure 4:
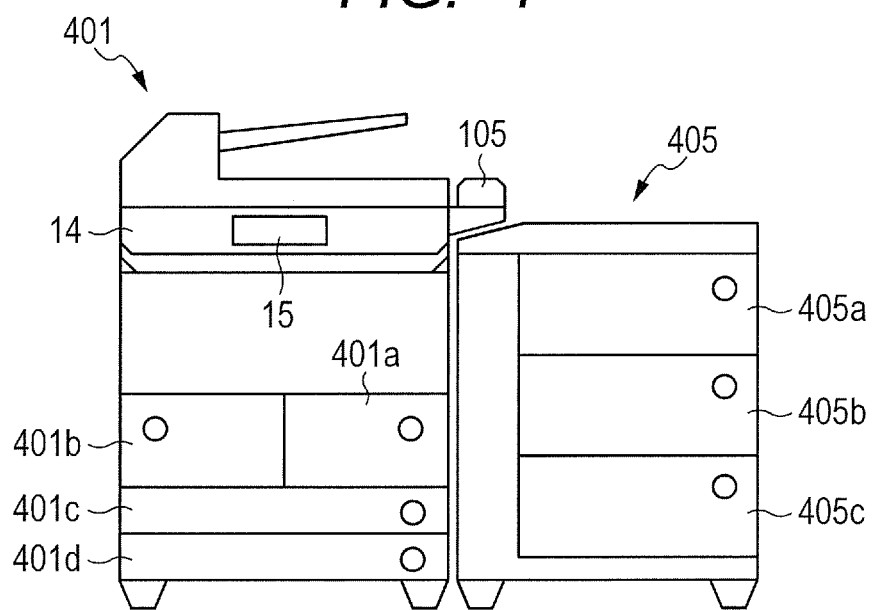
FIG. 4 is a diagram illustrating an outer appearance of the image forming apparatus illustrated in FIGS. 1A and 1B.

FIG. 4 is a diagram illustrating an outer appearance of the image forming apparatus 1 illustrated in FIGS. 1A and 1B.

More specifically, FIG. 4 illustrates a main body 401 of the image forming apparatus 1. The main body 401 comprises a sheet feeding device (not illustrated) at the lower part thereof, sheet cassettes 401a to 401d which serve as the sheet holding unit for holding sheets, and a pickup roller (not illustrated) which is used to transport the sheets loaded and held in the sheet cassettes 401a to 401d. When an image forming operation is started, the sheets are separated and transported one by one from the sheet cassettes 401a to 401d by the pickup roller, and an image forming process is performed to the transported sheet through image forming processes such as charging, transferring, fixing and the like.

Incidentally, the operation panel 15, the numerical keypad illustrated in FIG. 3, and hard keys such as a "set/register" key and the like to be depressed to perform the various settings of the image forming apparatus are provided on the operation unit 14. Also, the operation panel 15 has the function as the touch panel.

A sheet feeding deck 405 is optionally connected to the main body 401. More specifically, the sheet feeding deck 405 comprises a sheet feeding device (not illustrated) at the lower part thereof, sheet cassettes 405a to 405c which serve as the sheet holding unit for holding sheets, and a pickup roller (not illustrated) which is used to transport the sheets loaded and held in the sheet cassettes 405a to 405c. The sheets are selectively fed and transported from the sheet cassettes 405a to 405c being the sheet holding unit provided in the sheet feeding deck 405. Then, the image forming process is performed to the selected sheet through the image forming processes such as charging, transferring, fixing and the like.

As illustrated in FIG. 4, in the present embodiment, the four sheet cassettes are provided in the main body 401 and the three sheet cassettes are provided in the sheet feeding deck 405, so that the seven sheet cassettes are provided totally. Here, in the image forming apparatus 1 according to the present embodiment, it is possible to perform sheet settings concerning a sheet size, a sheet kind (type) and the like for each of the seven sheet cassettes. Further, in a case where the sheet has been exhausted and thus the sheet cassette is in a supply (replenishment) state, the image forming apparatus 1 performs a process of automatically selecting, from among a plurality of sheet feeding stages, the sheet feeding stage from which the sheet to be used in printing are supplied, according to the sheet size and the sheet kind (type) of the sheet. Hereinafter, a method of performing the sheet setting for each sheet cassette, and an automatic sheet selecting process will be described.

[Sheet Setting/Automatic Sheet Selecting Process]

FIGS. 5A and 5B are diagrams illustrating examples of the UI screens to be displayed on the operation panel 15 illustrated in FIG. 1A. Hereinafter, a process of registering the sheet setting for each sheet cassette from the "setting/registration" screen will be described.

If the "set/register" key on the operation unit illustrated in FIG. 1A is depressed, the "setting/registration" screen is displayed on the operation panel 15. Then, if a button corresponding to the sheet setting is depressed on this screen, then the screen illustrated in FIG. 5A for setting the sheet kind (type) of the sheet to be set to the sheet cassette is displayed.

A button group 501 for selecting the sheet cassettes is provided on the screen illustrated in FIG. 5A. Thus, if any of the buttons included in the button group is depressed by the user, the desired sheet cassette can be selected. If any of the sheet cassettes is selected from the button group 501 and then a setting button 502 is depressed, the screen illustrated in FIG. 5B is displayed.

A button group 511 for setting the sheet kind (type) is provided on the screen illustrated in FIG. 5B. Thus, if any of the buttons included in the button group is depressed, the sheet kind (type) can be set. If the user wishes to stop the setting on this screen, he/she depresses a cancel button 512. Namely, if the cancel button 512 is depressed, the setting is not performed and the screen is returned to the screen illustrated in FIG. 5A. On the other hand, if the user wishes to decide the sheet kind (type), he/she depresses an OK button 513. Namely, if the OK button 513 is depressed, the setting is performed and then the screen is returned to the screen illustrated in FIG. 5A. Further, if the user wishes to perform the setting for another sheet feeding stage, he/she selects the desired sheet cassette from the button group 501 and repeats the setting process to the selected sheet cassette. On the other hand, if the user does not wish to perform the setting any more, he/she depresses a close button 503 to terminate the setting.

Incidentally, in the present embodiment, it should be noted that a cassette 1 corresponds to the sheet cassette 401a of the image forming apparatus 1, cassettes 2 to 4 respectively correspond to the sheet cassettes 401b to 401d in this order, and cassettes 5 to 7 respectively correspond to the sheet cassettes 405a to 405c of the sheet feeding deck 405.

Table 1 described below indicates an example of the information set to each sheet cassette according to the present embodiment. Namely, when the sheet setting process is terminated, the data of each of the cassettes 1 to 7 in Table 1 is updated. Then, the updated data can be stored in either the memory in the controlling unit 13 or the setting value holding unit 109.

TABLE 1

| Cassette No. | Sheet size | Sheet type |
| --- | --- | --- |
| cassette 1 | A4 | plain paper |
| cassette 2 | B5 | plain paper |
| cassette 3 | A3 | plain paper |
| cassette 4 | B5 | plain paper |
| cassette 5 | A4 | plain paper |
| cassette 6 | A4 | cardboard |
| cassette 7 | A4 | plain paper |

Figure 6:
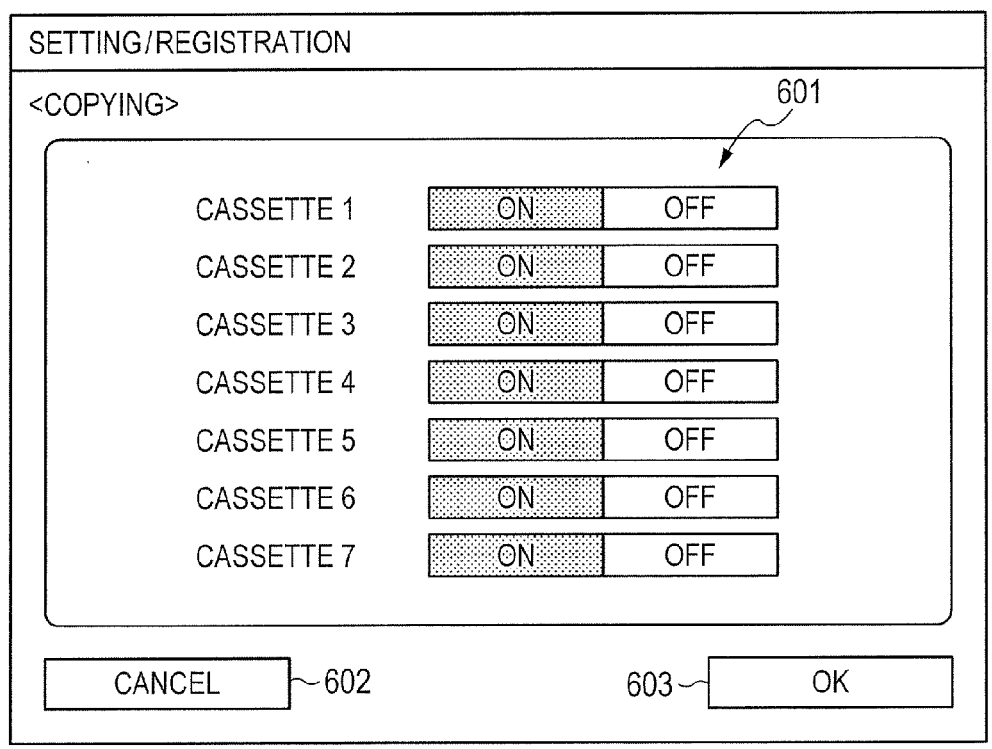
FIG. 6 is a diagram illustrating a UI screen to be displayed on the operation panel.

FIG. 6 is a diagram illustrating an example of the UI screen for selecting the sheet cassette to which the automatic sheet selecting process is performed.

In the present embodiment, it should be noted that the automatic sheet selecting process is the process of automatically selecting, from among the plurality of the sheet feeding stages, the sheet cassette from which the sheet to be used in printing is fed, according to the sheet size and the sheet kind (type), and the automatic sheet selecting process is performed by the controlling unit 13. For example, if the sheet of the used sheet cassette is exhausted while a copying job is being executed, it is possible to automatically select the appropriate sheet cassette even if the user does not select the necessary sheet cassette from the operation panel 15.

If the "set/register" key on the operation unit is depressed, the "setting/registration" screen is displayed on the operation panel 15. Then, if a button corresponding to the automatic sheet selection is depressed on this screen, then the screen illustrated in FIG. 6 is displayed. On this screen, the provided sheet cassettes and the sheet sizes of the respective sheet cassettes are displayed. Therefore, it is possible by using a selecting button group 601 to instruct whether or not to set the target sheet cassette as the cassette to be automatically selected.

More specifically, the cassette for which "ON" is depressed is the cassette capable of being set as the target of the automatic sheet selecting process, whereas the cassette for which "OFF" is depressed is the cassette incapable of being set as the target of the automatic sheet selecting process. A cancel button 602 is depressed to stop the setting on this screen. If an OK button 603 is depressed, the setting value is stored in the memory, and the setting is terminated.

If the "ON" and "OFF" setting for the automatic sheet selecting process is terminated, the data of any of the cassettes 1 to 7 in Table 2 is updated in correspondence with the setting. The updated data, which can be stored in either the memory in the controlling unit or the setting value holding unit 109, is used to automatically select the sheet cassette. In the example of Table 2, it is set that all the cassettes 1 to 7 are used in the automatic sheet selecting process.

TABLE 2

| Cassette No. | State |
| --- | --- |
| cassette 1 | ON |
| cassette 2 | ON |
| cassette 3 | ON |
| cassette 4 | ON |
| cassette 5 | ON |
| cassette 6 | ON |
| cassette 7 | ON |

Figure 7:
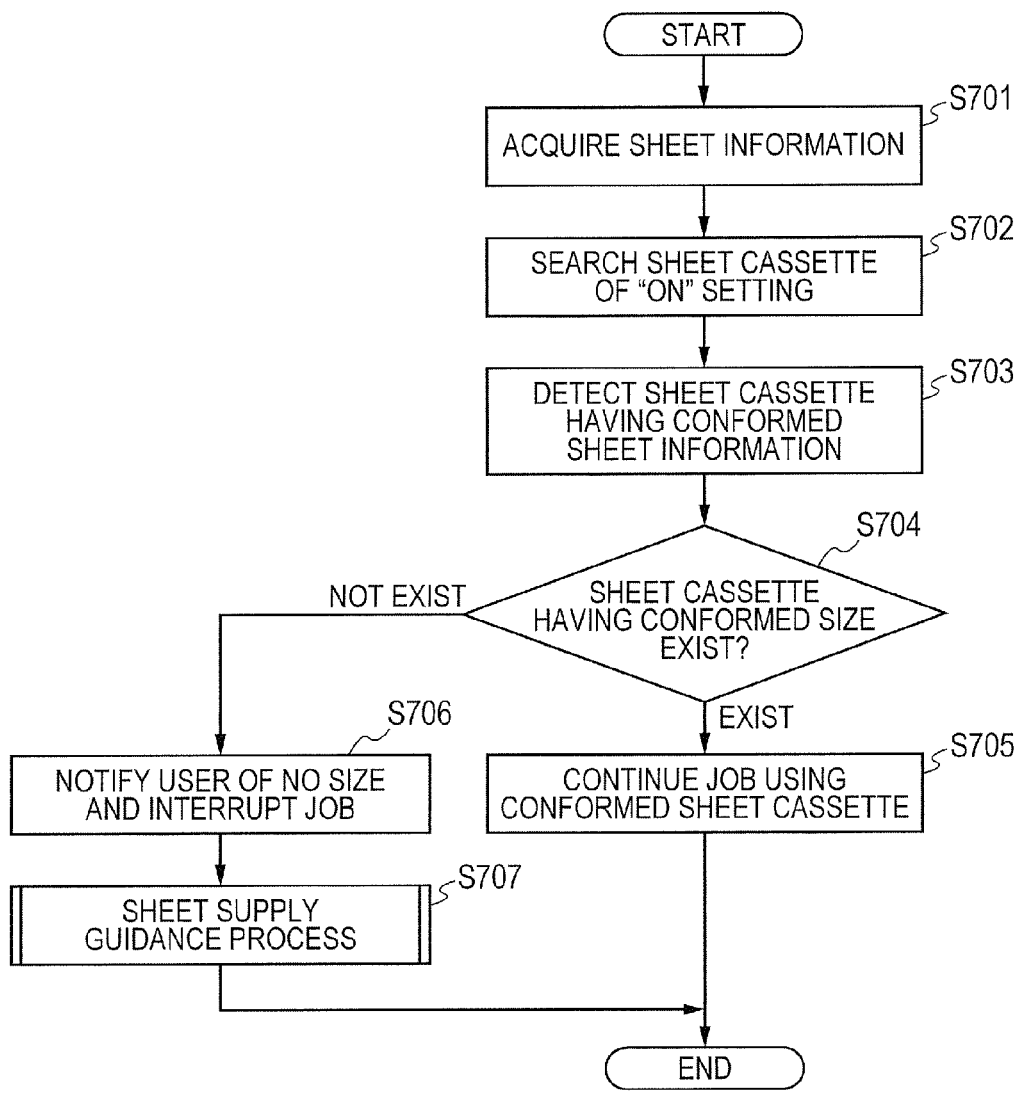
FIG. 7 is a flow chart for describing a controlling method of the image forming apparatus.

FIG. 7 is a flow chart for describing a controlling method of the image forming apparatus according to the present embodiment, and this is a process example to be performed when automatically selecting the sheet cassette in a job for which the sheet size has been designated. Incidentally, processes corresponding to the respective steps included in the relevant flow chart are performed on the condition that the CPU of the controlling unit 13 executes programs stored in the memory.

First, if the automatic sheet selecting process is started, the controlling unit 13 acquires in S701 the sheet information (i.e., the sheet size and the sheet kind (type)) requested for the process, from the attribute designated in the job. Next, in S702, the controlling unit 13 searches for the sheet cassette of which the state has been set to "ON" in Table 2, that is, the sheet cassette to be used in the automatic sheet selecting. Next, in S703, the controlling unit 13 detects that, among the sheet cassettes in the "ON" state, the sheet cassette of which the sheet information conforms to the sheet information acquired in S701 exists in "Cassette No." of Table 1.

In S704, the controlling unit 13 determines whether or not the sheet cassette having the conformed sheet size exists. If it is determined that the sheet cassette having the conformed sheet size exists, the process advances to S705 to continue the job by using the sheet cassette of the conformed sheet size existing in "Cassette No.".

On the other hand, if it is determined in S704 that the sheet cassette having the conformed sheet size does not exist, the process advances to S706, and the controlling unit 13 notifies the user that there is no usable sheet size and interrupts the job. Then, the process further advances to S707 to perform a sheet supply guidance process, and the process in the flow chart is terminated.

As described above, according to the present embodiment, in the image forming apparatus which comprises the plurality of the sheet cassettes, it is possible to support sheet supply work in a case where the sheet designated in the job such as a copying job, a PDL (page-description language) printing job or the like is exhausted from any of the sheet cassettes in the middle of the job. In particular, it is possible also for a user such as a person with impaired vision who needs voice guidance to easily achieve the sheet supply work without any help by another user.

If a lack of sheet is detected in the middle of the job, such an error is displayed on the operation panel 15 or notified by the voice outputting unit 105, and the job is interrupted until the sheet is supplied or replenished. Then, to restart the interrupted job, the user has to perform the sheet supply work. Incidentally, in the present embodiment, the lack of sheet is detected when the sheet is exhausted completely. However, the lack of sheet may be detected when a sheet residual quantity becomes a predetermined quantity (not zero), that is, when the number of remaining sheets decreases.

Conventionally, in this state, the user who needs the voice guidance often asks for a help by another user. Under such conditions, after completion of the sheet supply work by another user, since the relevant user necessarily checks the situation of the restarted own job, a wasteful time occurs.

On another front, the sheet supply work is very difficult practically for the user who needs the voice guidance because "the information concerning the sheet to be supplied", "the method of the supply work" and "the information concerning the sheet cassette to be supplied with the sheets" are unclear for the relevant user.

Here, "the information concerning the sheet to be supplied" indicates the information concerning the sheet to be supplied or replenished to the sheet cassette. For example, this information includes the information concerning a sheet kind (type), the information concerning a sheet size, the information concerning a sheet depository, and the like. Any problem does not occur if the sheets to be supplied to the sheet cassette are placed nearby the image forming apparatus 1. However, there is a case where the depository dedicated for the sheets is distant from the printing apparatus due to the reason of an actual office having the printing apparatus. Further, there is a case where it is necessary to select the predetermined sheet from a plurality of racks.

Further, "the method of the supply work" indicates the flow of the supply work itself of opening the cover of the sheet cassette, supplying the sheets by a proper method, and finally closing the cover of the sheet cassette. Although it is considered that seemingly the supply work is not difficult, actually the affordance for the user is often secured through visual information. For example, since a normal user has already grasped the location of the handle of the sheet cassette, the drawing direction of the sheet cassette, the sheet loading direction and the like, he/she can perform the work without hesitation. On the other hand, since the user who needs the voice guidance cannot acquire such visual information, he/she needs finer working guidance for performing the work.

Furthermore, "the information concerning the sheet cassette to be supplied with the sheets" indicates the concrete location information of the sheet cassette. It is conceivable that the cassette number such as "the sheet cassette 2" or the like is notified to the user for enabling him/her to identify the sheet cassette. However, it is better for the user who needs the voice guidance to be notified by the concrete location information such as "at the lower right of the main body" or the like. Namely, such concrete notification enables the user who needs the voice guidance to identify the sheet cassette more easily.

Further, in the case where the job is interrupted because of the lack of sheet, the sheet cassette for which the error is notified is ordinarily the sheet cassette from which the sheet was fed immediately before the interruption. Consequently, in the printing apparatus comprising the plurality of sheet cassettes as in the present embodiment, there is a case where the location of the sheet cassette for which the error is notified when the job is interrupted because of the lack of sheet remarkably decreases accessibility for the user.

For example, in the setting values in Table 1 and Table 2, it is assumed that the sheet information acquired in S701 of FIG. 7 indicates "A4 (plain paper)". In this case, since the cassettes 2, 3, 4 and 6 respectively correspond to the different sheet sizes and sheet kind (type), these cassettes are eliminated from the target of the automatic sheet selection. Namely, the sheet feeding process of the sheet cassettes by the automatic sheet selecting process is performed with respect to the cassette 1→the cassette 5→the cassette 7 in this order.

As a result, when the lack of sheet is detected, the cassette 7 (405c of FIG. 4) from which the sheets were fed lastly is notified. Since the user ordinarily stands in front of the operation unit 14, the accessibility to the location of the cassette 7 is low for the user.

Likewise, in the setting values in Table 1 and Table 2, it is assumed that the sheet information acquired in S701 of FIG. 7 indicates "B5 (plain paper)". In this case, since the sheet feeding process of the sheet cassettes in the automatic sheet selecting process is performed with respect to the cassette 2→the cassette 4 in this order. Thus, the cassette 4 is notified lastly. Here, since the cassette 4 (401d of FIG. 4) is at the lower portion of the printing apparatus, there is a case where it is difficult for, e.g., a user who uses a wheelchair to perform the supply work.

In the present embodiment, the sheet supply guidance process (S707) is provided as a measure for solving such a problem. Here, the sheet supply guidance process is achieved on the condition that the CPU of the controlling unit 13 reads and executes necessary programs stored in the memory while referring the data held in the guidance holding unit 101, the setting value holding unit 109 and other storing units. Hereinafter, the sheet supply guidance process in the present embodiment will be described in detail.

Incidentally, in the present embodiment, various information concerning the devices, the sheets, the supply work guidance and the like is notified to the user. Here, it should be noted that such notification is displayed on the operation panel 15 and also performed with the voice synthesis by the voice outputting unit 105.

<First Guidance Process>

Figure 8:
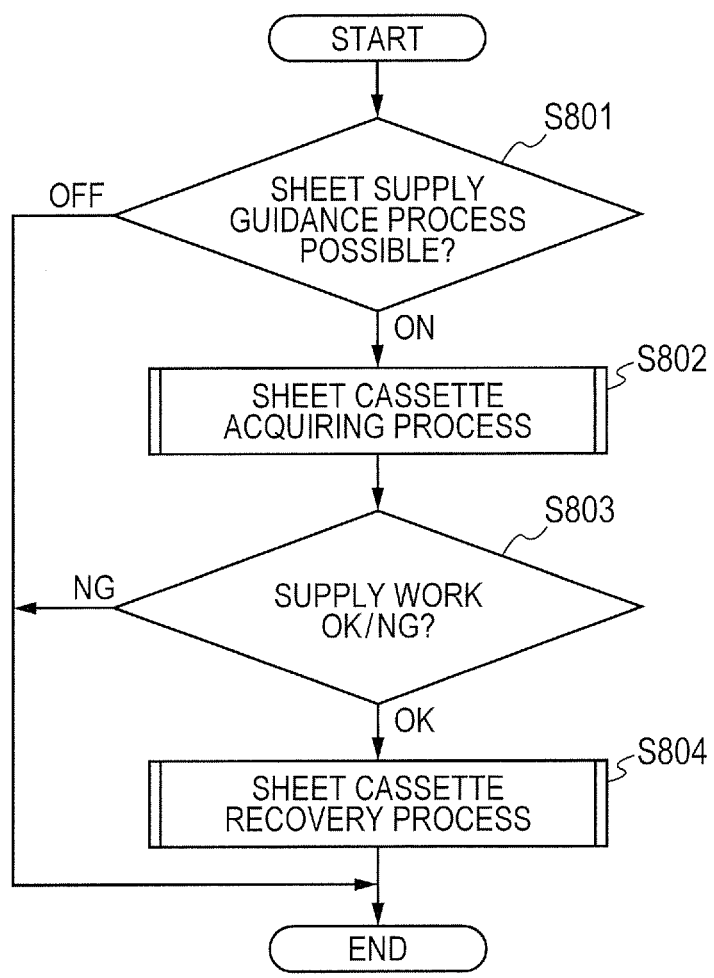
FIG. 8 is a flow chart for describing a controlling method of the image forming apparatus.

FIG. 8 is a flow chart for describing a controlling method of the image forming apparatus according to the present embodiment, and this is an example of the sheet supply guidance process. Incidentally, processes corresponding to the respective steps included in the relevant flow chart are achieved on the condition that the CPU of the controlling unit 13 loads and executes programs stored in the memory.

Initially, in S801, the controlling unit 13 determines whether or not the sheet supply guidance process is possible. Incidentally, such a value indicating whether or not the sheet supply guidance process is possible has been previously set by the user. In the present embodiment, if the "set/register" key on the operation unit 14 is depressed, then it is possible to set this value through the "setting/registration" screen displayed on the operation panel 15.

In any case, if this setting value is "ON", the sheet supply guidance process is performed, and then the process advances to S802. On the other hand, if this setting value is "OFF", the sheet supply guidance process is not performed, and the process in the flow chart is terminated immediately. In this case, the job-interruption state in S706 continues.

If the controlling unit 13 determines in S801 that the setting value is "ON", that is, the sheet supply guidance process is possible, the controlling unit 13 performs a sheet cassette acquiring process in S802. More specifically, in S802, the process of acquiring the sheet cassette to which the user has to supply the sheets (also called the supply-target sheet cassette, hereinafter) is performed.

Then, in S803, the controlling unit 13 determines whether or not the supply work has been normally completed, by supporting the supply work by the user. If the controlling unit 13 determines that the supply work has been normally completed, then the controlling unit 13 performs in S804 a sheet cassette recovery process, so that the interrupted job is again executed.

On the other hand, if the controlling unit 13 determines in S803 that the supply work cannot be normally completed for some reason, then the process in the flow chart is terminated.

Hereinafter, the sheet cassette acquiring process in S802 and the supply work supporting process in S803 will be described in detail.

[Sheet Cassette Acquiring Process]

Figure 9:
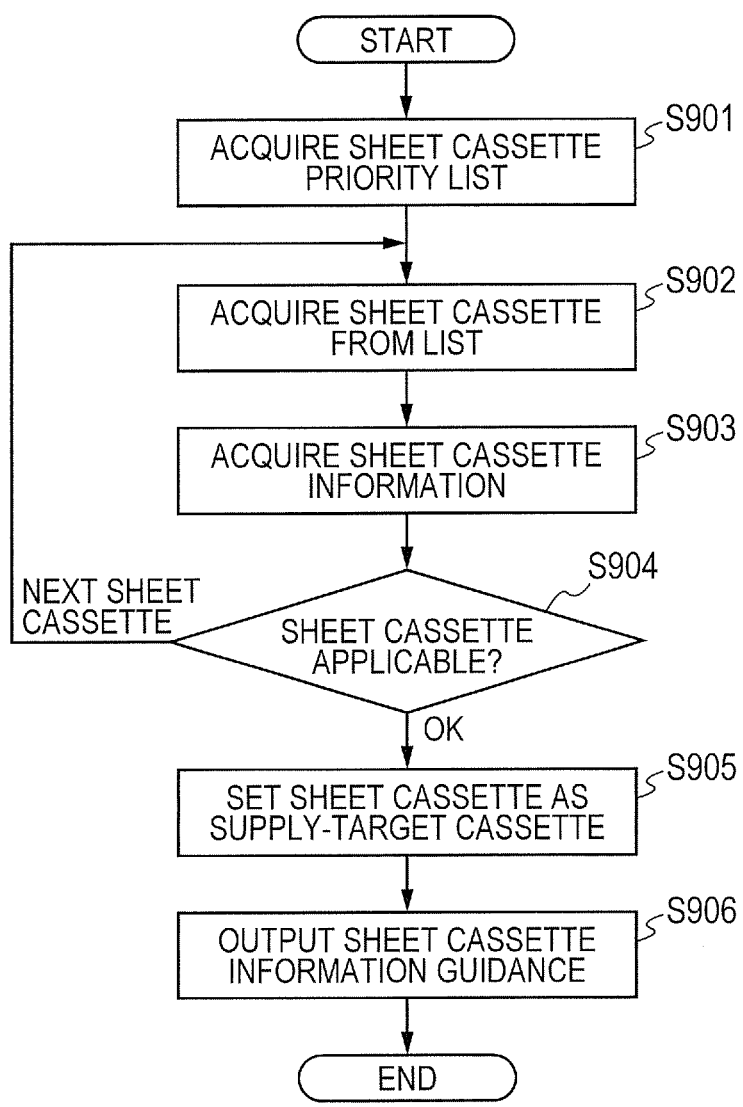
FIG. 9 is a flow chart for describing a controlling method of the image forming apparatus.

FIG. 9 is a flow chart for describing a controlling method of the image forming apparatus according to the present embodiment, and this is a detailed processing procedure example of the sheet cassette acquiring process shown in FIG. 8. More specifically, the sheet cassette acquiring process is the process in which the apparatus automatically detects the supply-target sheet cassette from among the plurality of sheet cassettes on the basis of a sheet cassette priority list, and further notifies the user of the information indicating the supply-target sheet cassette. Incidentally, processes corresponding to the respective steps included in the relevant flow chart are achieved on the condition that the CPU of the controlling unit 13 loads and executes programs stored in the memory. Hereinafter, the sheet cassette priority list will be described.

Figures 10, 11:
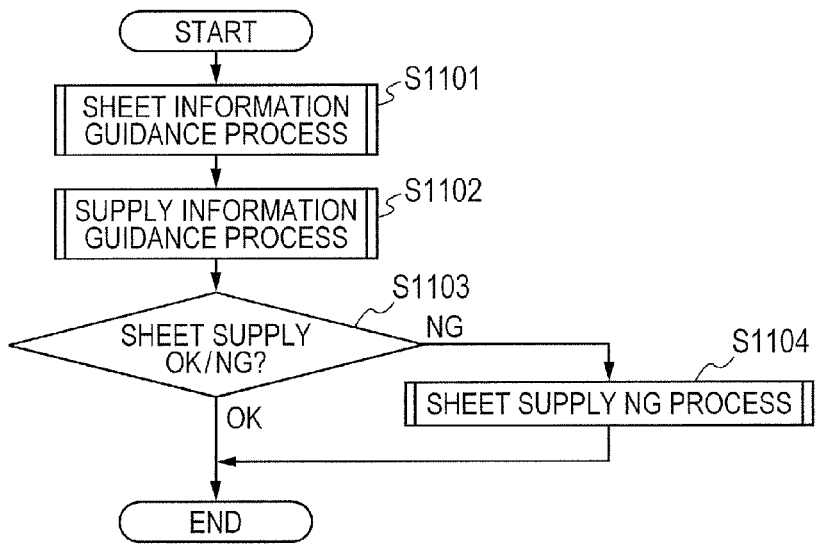
FIG. 10 is a diagram illustrating a UI screen to be displayed on the operation panel.
FIG. 11 is a flow chart for describing a controlling method of the image forming apparatus.

FIG. 10 is a diagram illustrating an example of the UI screen to be displayed on the operation panel 15. Here, it should be noted that the relevant example is a UI screen example for setting the sheet cassette priority list.

If the "set/register" key on the operation unit is depressed, the "setting/registration" screen is displayed on the operation panel 15. Then, if a button corresponding to the setting of the sheet cassette priority list is depressed on the displayed screen, the screen for setting the sheet cassette priority list illustrated in FIG. 10 is displayed.

If any of the items included in a priority list 1001 is depressed, the depressed item is highlighted on the screen to indicate a selection state (identification example). More specifically, FIG. 10 indicates that the cassette 2 is in the selection state. Further, if an "UPWARD" button 1002 is depressed in this state, the positions of the cassettes 1 and 2 are replaced with each other so that the cassette 2 becomes the highest-priority sheet cassette. On the other hand, if a "DOWNWARD" button 1003 is depressed instead of the "UPWARD" button 1002, the positions of the cassettes 2 and 3 are replaced with each other so that the cassette 2 becomes the third-priority sheet cassette. Buttons 1004 and 1005 are scroll buttons for the priority list 1001.

Incidentally, the contents which were set on the screen of FIG. 5B are reflected as the prescribed values in the priority list 1001. By arbitrarily setting the contents of the priority list, the user can set the priority order of the sheet cassettes to be notified when the job is interrupted because of the lack of sheet.

Further, the UI screen includes a cancel button 1006 and an OK button 1007. If the OK button is depressed, the setting of the priority list is terminated.

Table 3 described below indicates an example of the sheet cassette priority list. If the setting of the sheet cassette priority list is terminated, any of the data of the cassettes 1 to 7 in Table 3 is updated in correspondence with the terminated setting. The updated data can be stored in either the memory in the controlling unit 13 or the setting value holding unit 109.

TABLE 3

| Priority No. | Cassette No. |
|---|---|
| 1 | cassette 5 |
| 2 | cassette 6 |
| 3 | cassette 1 |
| 4 | cassette 2 |
| 5 | cassette 3 |
| 6 | cassette 4 |
| 7 | cassette 7 |

These are the description of the sheet cassette priority list.

Hereinafter, the sheet cassette acquiring process in FIG. 9 will be described again.

If the controlling unit 13 acquires the sheet cassette priority list in S901, then the controlling unit 13 acquires the highest-priority sheet cassette in S902. The cassette 5 is acquired in the setting of Table 3. Next, in S903, the information of the acquired cassette 5 is acquired by referring the setting values in Table 1. Namely, the cassette 5 (A4/plain paper) is acquired.

In S904, the controlling unit 13 determines, based on the information of the cassette 5 and the sheet information acquired in S701, whether or not the relevant sheet cassette is applicable (that is, whether or not the sheets can be supplied to the relevant sheet cassette). If the controlling unit 13 determines in S904 that the sheet information is not conformed, the process returns to S902 so that the controlling unit 13 acquires the next-highest-priority sheet cassette. On the other hand, if the controlling unit 13 determines in S904 that the sheet information is conformed and the sheets can be supplied to the sheet cassette, the process advances to S905 to set the current sheet cassette as the supply-target sheet cassette, and store the setting value in the memory thereof.

Finally, in S906, the controlling unit 13 causes the voice outputting unit 105 to output, by a voice, guidance information previously incorporated for the relevant sheet cassette, for the purpose of guidance to the user. Here, the guidance information previously incorporated is device inherent information. More specifically, the guidance information includes position information of the image forming apparatus 1 such as "at the lower right of the main body". The guidance selecting unit 104 selects the necessary guidance information from the guidance holding unit 101 on the basis of the device information acquired by the device information acquisition unit 121. Incidentally, as another guidance information, information such as the sheet information of the sheet to be supplied to the sheet cassette, or the setting value concerning the current job may be notified to the user.

By the above sheet cassette acquiring process, the user can acquire "the information concerning the sheet cassette to be supplied with the sheets".

Thus, the user can accurately know or grasp at which position the supply-target sheet cassette has been provided in the image forming apparatus. In other words, the user can correctly acquire the position information of the sheet cassette.

Further, even when the image forming apparatus is equipped with the plurality of the sheet cassettes, since the sheet cassette priority list is used, the apparatus itself automatically selects the sheet cassette suitable for the user, according to the content of the job. Thus, also the user who needs the voice guidance can preferentially set the sheet cassette of which accessibility is always high, as the supply-target sheet cassette.

[Supply Work Supporting Process]

FIG. 11 is a flow chart for describing a controlling method of the image forming apparatus according to the present embodiment, and this is an example of the supply work supporting process. Incidentally, processes corresponding to the respective steps included in the relevant flow chart are achieved on the condition that the CPU of the controlling unit 13 loads and executes programs stored in the memory.

Initially, in S1101, the controlling unit 13 performs a sheet information guidance process which is the process of acquiring the sheet information corresponding to the sheet cassette acquired in the sheet cassette acquiring process (S802) and a sheet information message, and performing the voice guidance.

Next, in S1102, the controlling unit 13 performs a supply information guidance process which is the process of performing the voice guidance concerning the work of supplying the sheets to the sheet cassette. Next, in S1103, the controlling unit 13 determines whether or not the sheet supply is normally performed. If it is determined that the sheet supply is normally performed (OK), then the process in the flow chart is terminated.

On the other hand, if the controlling unit 13 determines in S1103 that the sheets are not supplied normally (NG), the process advances to S1104. Then, in S1104, the controlling unit 13 performs s sheet supply NG process. In the sheet supply NG process, the message that the sheet supply work is not completed, the information concerning the supply-target sheet cassette, the sheet information, and the like are notified by displaying them on the operation panel 15 or outputting them by the voice with the voice outputting unit 105. Then, the process in the flow chart is terminated.

Hereinafter, the sheet information guidance process (S1101) and the supply information guidance process (S1102) will be described in detail.

Here, the sheet information guidance process is the process of acquiring the sheet information corresponding to each sheet cassette and the sheet information message, and performing the voice guidance. Further, the sheet information is the information which is set to each sheet cassette as indicated in Table 1. More specifically, the sheet information includes a sheet size, a sheet kind (type) and the like.

Furthermore, the sheet information message is the message information which has been previously set to each sheet cassette by the user. The sheet information message is the inherent information concerning a sheet cassette and the sheet to be supplied to the relevant sheet cassette. For example, the sheet information message indicates a position of the sheet cassette (e.g., the lower right of the main body), a depository of the sheets (e.g., the second stage of the rack A of the depository), and the like.

In the present embodiment, if the "set/register" key on the operation unit 14 is depressed, the "setting/registration" screen is displayed on the operation panel 15 so that the sheet information message can be set thereon. More specifically, if the "set/register" key on the operation unit 14 is depressed, the "setting/registration" screen is displayed on the operation panel 15. On this screen, if a button corresponding to the setting of the sheet information message is depressed, then a screen illustrated in FIG. 12 for setting the sheet information message is displayed.

Figure 12:
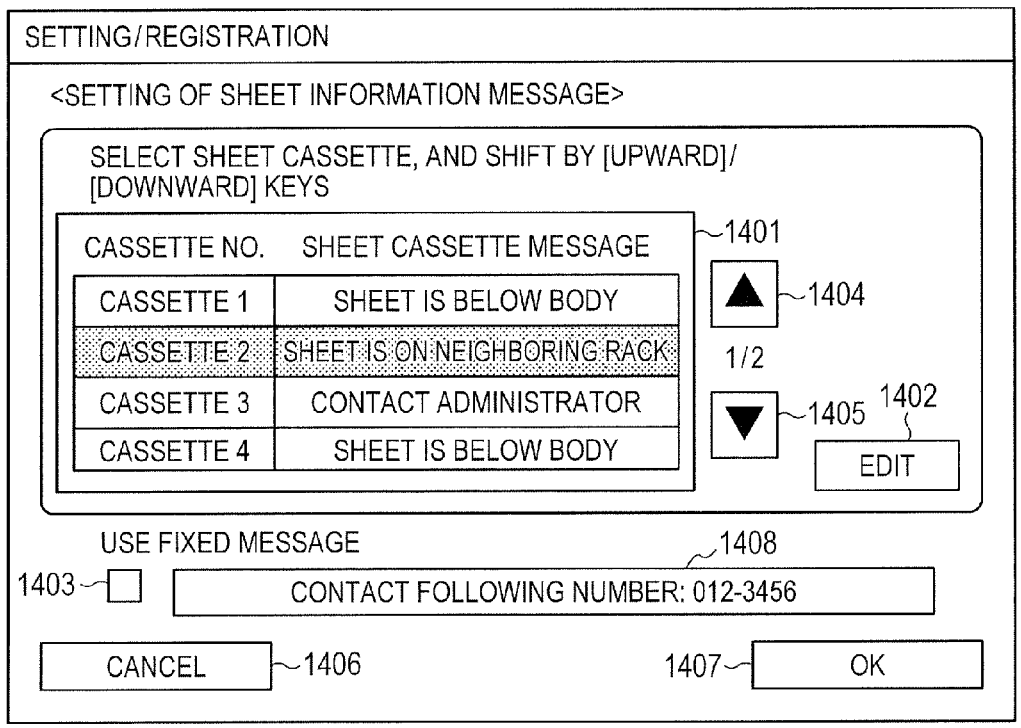
FIG. 12 is a diagram illustrating a UI screen to be displayed on the operation panel.

FIG. 12 is the diagram illustrating an example of the UI screen to be displayed on the operation panel 15, and this example is a UI screen example for setting the sheet information message.

In FIG. 12, if any item included in a list 1401 for list-displaying the respective sheet cassettes and their corresponding sheet cassette messages is depressed, the depressed item is highlighted on the screen to indicate a selection state. More specifically, FIG. 12 indicates that the cassette 2 is in the selection state. Further, if an "EDIT" button 1402 is depressed in this state, a software keyboard (not illustrated) is displayed, and the screen shifts to a message input editing mode. In the message input editing mode, the user can input/edit the message corresponding to each sheet cassette. Buttons 1404 and 1405 are scroll buttons for the list 1401.

Further, the UI screen includes a check box 1403. In case of setting a fixed message without setting the message corresponding to the sheet cassette, the check box 1403 is checked so that the fixed message is set in a text box 1408. If the text box 1408 is depressed, the software keyboard is started, and the screen shifts to the message input editing mode.

Furthermore, the UI screen includes a cancel button 1406 and an OK button 1407. If the OK button is depressed, the setting of the sheet information message is terminated. The setting value set on this screen is updated for each sheet cassette as the data format same as those of Tables 1 and 2. Incidentally, the updated data can be stored in either the memory in the controlling unit 13 or the setting value holding unit 109.

Figure 13:
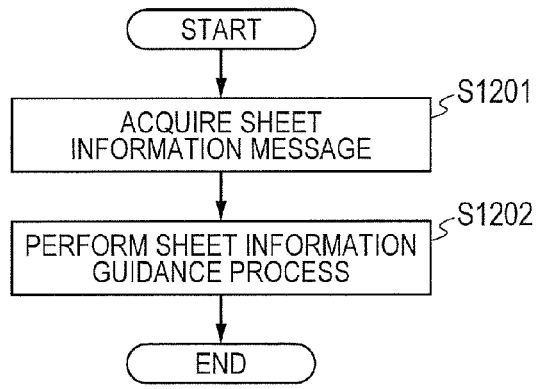
FIG. 13 is a flow chart for describing a controlling method of the image forming apparatus.

FIG. 13 is a flow chart for describing a controlling method of the image forming apparatus according to the present embodiment, and this is an example of the sheet information guidance process. Incidentally, processes corresponding to the respective steps included in the relevant flow chart are achieved on the condition that the CPU of the controlling unit 13 loads and executes programs stored in the memory.

Initially, in S1201, the controlling unit 13 acquires the sheet cassette acquired in the sheet cassette acquiring process (S802) and the sheet information message corresponding to the acquired sheet cassette.

Next, in S1202, the controlling unit 13 performs the sheet information guidance process. In this process, the controlling unit converts the acquired sheet information message into the guidance information through a voice synthesis process by referring the guidance holding unit 101 as needed, and notifies the user of the acquired guidance information by the voice using the voice outputting unit 105. Then, the process in the flow chart is terminated. Incidentally, since the voice synthesis process of converting arbitrary text data into data for which the voice guidance can be performed is a known technique, the description thereof is omitted.

Figure 14:
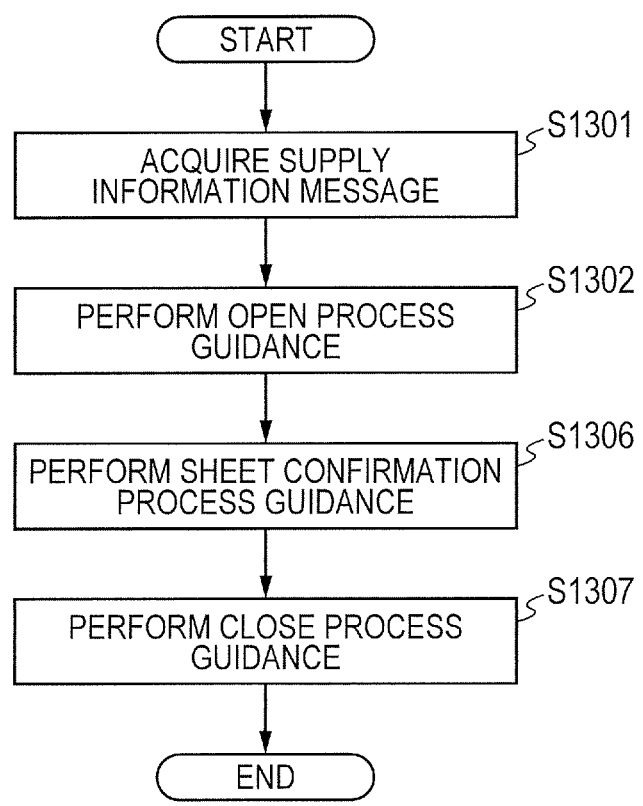
FIG. 14 is a flow chart for describing a controlling method of the image forming apparatus.

FIG. 14 is a flow chart for describing a controlling method of the image forming apparatus according to the present embodiment, and this is an example of the supply information guidance process. Incidentally, processes corresponding to the respective steps included in the relevant flow chart are achieved on the condition that the CPU of the controlling unit 13 loads and executes programs stored in the memory.

Incidentally, in the present embodiment, the supply information guidance process is the process of guiding, by the voice output from the voice outputting unit 105, the user to perform the supply work according to the process operation of the user, on the basis of the guidance information previously incorporated for each sheet cassette. In this process, the acquisition of the guidance information in each step is achieved on the condition that the guidance selecting unit 104 selects the necessary guidance information from the guidance holding unit 101 based on the device information acquired by the device information acquisition unit 121.

Initially, in S1302, the controlling unit 13 acquires the sheet cassette acquired in the sheet cassette acquiring process (S802) and the guidance information previously incorporated for the relevant sheet cassette. Namely, the controlling unit acquires the supply information message.

Next, in S1302, the controlling unit 13 performs the guidance process concerning an open operation of the sheet cassette by the user. This process is the process of notifying the user of a location of the handle of the sheet cassette, a drawing direction of the sheet cassette and the like, and then detecting whether or not the user can correctly open the sheet cassette based on the notified information. If the user can correctly open the sheet cassette, the process advances to S1306. On the other hand, if the user performs an erroneous operation, the controlling unit performs an error notification.

Next, in S1306, the controlling unit 13 performs the guidance process concerning a process of confirming the sheet supply operation by the user. This process is the process of notifying the user of a sheet direction, operations of the sheet width and read end regulatory guides, and the like, and then detecting whether or not the user can correctly supply the sheet based on the notified information. If the user can correctly supply the sheet, the process advances to S1307. On the other hand, if the user performs an erroneous operation, the controlling unit performs an error notification.

Finally, in S1307, the controlling unit 13 performs the guidance process concerning a close operation of the sheet cassette by the user. If the user can correctly close the sheet cassette, the process in the flow chart is terminated. On the other hand, if the user performed an erroneous operation, the controlling unit performs an error notification.

By the above supply work supporting process, the user can acquire "the information concerning the sheet to be supplied". Thus, also the user who needs the voice guidance can acquire the information of the sheet to be supplied (i.e., a sheet kind (type), a sheet size, a sheet depository, etc.), so that he/she does not have trouble in searching or looking for the sheets to be supplied.

Further, the user can acquire "the method of the supply work". Thus, also the user who needs the voice guidance can perform the sheet supply work of opening the sheet cassette, supplying the sheets by the appropriate method and finally closing the sheet cassette, without hesitation.

In the image forming apparatus which comprises the plurality of the sheet cassettes, there is the case where the sheets designated in the job such as the copying job, the PDL printing job or the like are exhausted in any of the sheet cassettes in the middle of the job. However, even in this case, it is possible according to the present embodiment to acquire "the information concerning the sheet cassette to be supplied with the sheets" by the sheet cassette acquiring process.

In addition, it is possible by the supply work supporting process to acquire "the information concerning the sheet to be supplied" and "the method of the supply work". Consequently, it is possible also for the user who needs the voice guidance to personally perform the sheet supply work with ease.

[Second Embodiment]

In the sheet cassette acquiring process of the first embodiment, the apparatus automatically detects, from among the plurality of the sheet cassettes, the supply-target sheet cassette to which the user has to supply the sheets, on the basis of the sheet cassette priority list. However, the present invention is not limited to this.

Namely, in the second embodiment, a case where the user oneself selects the supply-target sheet cassette in the sheet cassette acquiring process will be described.

Figure 15:
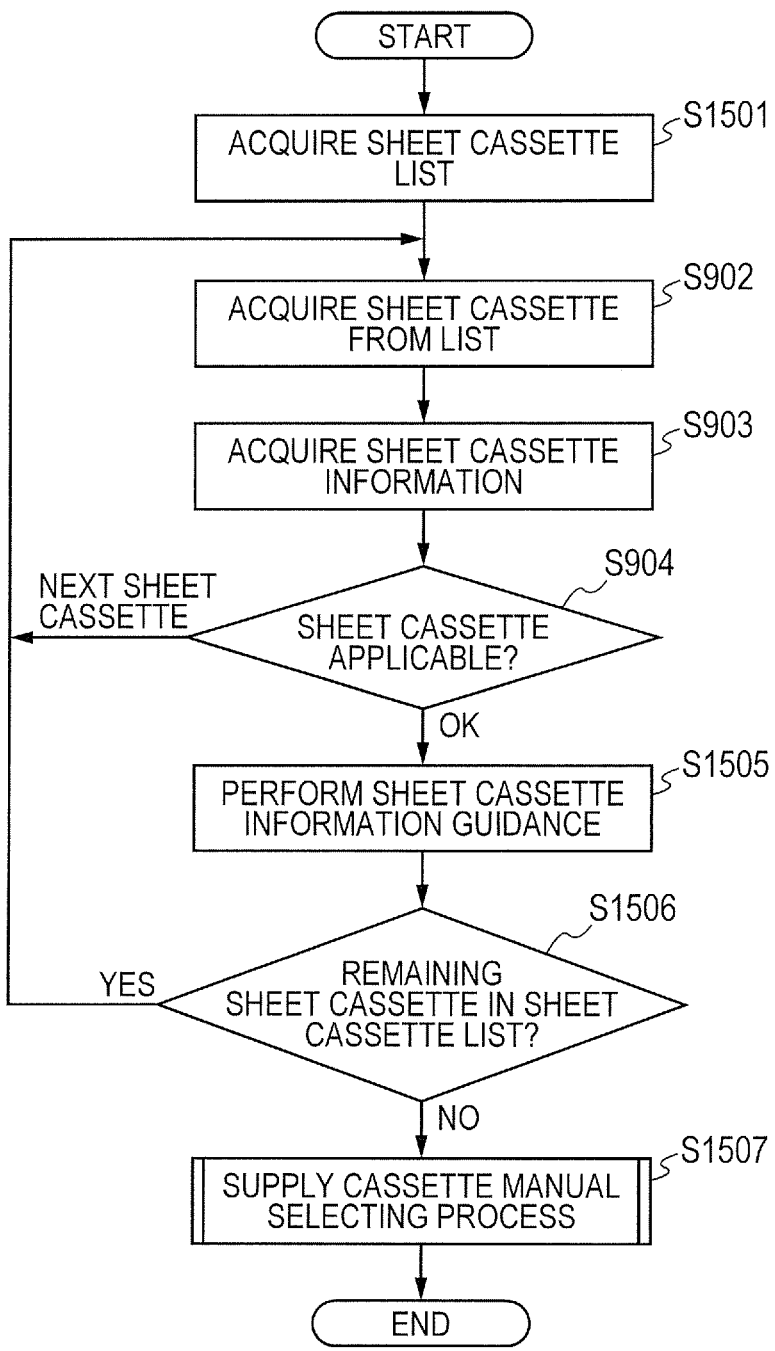
FIG. 15 is a flow chart for describing a controlling method of the image forming apparatus.

FIG. 15 is a flow chart for describing a controlling method of the image forming apparatus according to the present embodiment, and this is examples of the sheet cassette acquiring process and the process in which the user selects the supply-target sheet cassette. Incidentally, processes corresponding to the respective steps included in the relevant flow chart are achieved on the condition that the CPU of the controlling unit 13 loads and executes programs stored in the memory. Further, it should be noted that the processes in S902 to S904 are the same as those of FIG. 9 in the first embodiment.

In S1501, the controlling unit 13 acquires a sheet cassette list. This list includes the information which is set by the sheet settings in FIGS. 5A and 5B for to the respective sheet cassettes, i.e., the information in Table 1. Subsequently, after the processes in S902 to S904, the controlling unit notifies in S1505 the user of the information of the sheet cassettes.

Then, in S1506, the controlling unit 13 determines whether or not the remaining sheet cassette exists in the sheet cassette list. If the controlling unit 13 determines that the remaining sheet cassette exists, as well as the process in S904, the process returns to S902 to acquire the next sheet cassette. On the other hand, if the controlling unit 13 determines in S1506 that the remaining sheet cassette does not exist, the flow advances to S1507.

Finally, in S1507, the controlling unit 13 performs a supply cassette manual selecting process, and then the process in the flow chart is terminated. The supply cassette manual selecting process is the process in which the user selects the supply-target sheet cassette by using the numerical keypad (FIG. 3) provided on the operation panel 15 or the operation unit 14.

In the sheet cassette acquiring process, there is the case where the sheets designated in the job are exhausted in any of the sheet cassettes in the middle of the job. However, even in this case, according to the present embodiment, it is possible for the user to select, as the supply-target sheet cassette, the sheet cassette which is convenient for the user oneself, because all the sheet cassettes to which the sheets can be supplied are notified to the user.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a CPU, an MPU (micro processing unit), or other circuitry, and may include a network of separate computers or separate computer processors. The computer executable instructions may be provided to the computer, for example, from a network or the storage medium. The storage medium may include, for example, one or more of a hard disk, an RAM, an ROM, a storage of distributed computing systems, an optical disk (such as a CD (compact disc), a DVD (digital versatile disc), or a BD™ (Blue-ray Disc), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131635, filed Jun. 24, 2013, which is hereby incorporated by reference herein in its entirety.

What is claimed is:

1. An image forming apparatus, which forms an image on a sheet conveyed from a sheet holding unit, comprising:
    a storing unit configured to store first information indicating a depository of the sheet to be supplied to a first sheet holding unit, and store second information indicating a depository of the sheet to be supplied to a second sheet holding unit different from the first sheet holding unit; and
    a notification unit configured to perform a notification based on the first information stored in the storing unit in a case where an amount of sheets stored in the first sheet holding unit becomes a predetermined amount, and perform a notification based on the second information stored in the storing unit in a case where an amount of sheets stored in the second sheet holding unit becomes the predetermined amount,
    wherein at least one of the units is implemented by a CPU executing computer-executable code stored in a non-transitory computer-readable memory.

2. The image forming apparatus according to claim 1, further comprising a changing unit configured to change the first information indicating the depository of the sheet to be supplied to the first sheet holding unit to third information indicating another depository.

3. The image forming apparatus according to claim 1, wherein the notification unit performs a display on a displaying unit based on the first information stored in the storing unit in the case where the amount of sheets stored in to the first sheet holding unit becomes the predetermined amount, and performs a display on the displaying unit based on the second information stored in the storing unit in the case where the amount of sheets stored in the second sheet holding unit becomes the predetermined amount.

4. The image forming apparatus according to claim 1, wherein the notification unit outputs a voice by a voice outputting unit based on the first information stored in the storing unit in the case where the amount of sheets stored in the first sheet holding unit becomes the predetermined amount, and outputs a voice by the voice outputting unit based on the second information stored in the storing unit in the case where the amount of sheets stored in the second sheet holding unit becomes the predetermined amount.

5. The image forming apparatus according to claim 1, further comprising a selecting unit configured to select, according to sheet information designated in a job, the first sheet holding unit or the second sheet holding unit to be used as a sheet feeding source of the job.

6. A control method for an image forming apparatus which forms an image on a sheet conveyed from a sheet holding unit, the control method comprising:
- storing first information indicating a depository of the sheet to be supplied to a first sheet holding unit;
- storing second information indicating a depository of the sheet to be supplied to a second sheet holding unit different from the first sheet holding unit;
- performing a notification based on the stored first information in a case where an amount of sheets stored in the first sheet holding unit becomes a predetermined amount; and
- performing a notification based on the stored second information in a case where an amount of sheets stored in the second sheet holding unit becomes the predetermined amount.

7. A non-transitory computer-readable storage medium storing a program that when executed causes a computer to perform a control method for an image forming apparatus which forms an image on a sheet conveyed from a sheet holding unit, the control method comprising:
- storing first information indicating a depository of the sheet to be supplied to a first sheet holding unit;
- storing second information indicating a depository of the sheet to be supplied to a second sheet holding unit different from the first sheet holding unit;
- performing a notification based on the stored first information in a case where an amount of sheets stored in the first sheet holding unit becomes a predetermined amount; and
- performing a notification based on the stored second information in a case where an amount of sheets stored in the second sheet holding unit becomes the predetermined amount.

* * * * *